United States Patent
Oka et al.

(10) Patent No.: US 11,144,664 B2
(45) Date of Patent: Oct. 12, 2021

(54) RISK MANAGEMENT SUPPORT DEVICE

(71) Applicant: Nomura Research Institute, Ltd., Tokyo (JP)

(72) Inventors: Hirofumi Oka, Tokyo (JP); Shinya Oki, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 0 days.

(21) Appl. No.: 16/816,347

(22) Filed: Mar. 12, 2020

(65) Prior Publication Data

US 2021/0133345 A1    May 6, 2021

(30) Foreign Application Priority Data

Oct. 31, 2019  (JP) .............................. JP2019-198452

(51) Int. Cl.
| | |
|---|---|
| *H04L 29/06* | (2006.01) |
| *G06F 21/62* | (2013.01) |
| *H04L 9/08* | (2006.01) |

(52) U.S. Cl.
CPC ...... *G06F 21/6227* (2013.01); *G06F 21/6263* (2013.01); *H04L 9/0866* (2013.01); *H04L 9/0877* (2013.01)

(58) Field of Classification Search
CPC ............. H04L 63/1492; H04L 63/1433; H04L 9/0866; H04L 9/0877; G06F 21/6227; G06F 21/6263
See application file for complete search history.

(56) References Cited

U.S. PATENT DOCUMENTS

| | | | | |
|---|---|---|---|---|
| 2007/0294762 A1* | 12/2007 | Shraim | ............... | H04L 63/1491 726/22 |
| 2009/0241196 A1* | 9/2009 | Troyansky | .......... | H04L 63/1491 726/25 |
| 2009/0328216 A1* | 12/2009 | Rafalovich | ......... | H04L 43/0876 726/23 |
| 2016/0275303 A1 | 9/2016 | Narayanaswamy et al. | | |
| 2016/0277368 A1 | 9/2016 | Narayanaswamy et al. | | |
| 2018/0218167 A1 | 8/2018 | Narayanaswamy et al. | | |
| 2019/0012478 A1 | 1/2019 | Narayanaswamy et al. | | |
| 2020/0053121 A1* | 2/2020 | Wilcox | ............... | H04L 63/1483 |

FOREIGN PATENT DOCUMENTS

| | | |
|---|---|---|
| JP | 2019-16370 A | 1/2019 |
| JP | 2019-96339 A | 6/2019 |

* cited by examiner

*Primary Examiner* — Yogesh Paliwal
(74) *Attorney, Agent, or Firm* — Rankin, Hill & Clark LLP

(57) ABSTRACT

To easily recognize a situation where confidential information has leaked from an information system.
A risk management support server 400 that is connected, via a communication network, to an information system 100 managing confidential information includes a fictitious code request receiving unit configured to receive, from the information system 100, a request to acquire a fictitious code to be set in a part of items in the confidential information as well as a type of the item, a fictitious code generation unit configured to generate the fictitious code corresponding to a data format of the received type of the item, and a fictitious code providing unit configured to transmit the generated fictitious code to the information system 100.

6 Claims, 11 Drawing Sheets

FIG. 4

| INFORMATION SYSTEM | CONFIDENTIAL INFORMATION TYPE | ITEM TYPE | FICTITIOUS CODE | SETTING POSITION INFORMATION |
|---|---|---|---|---|
| A COMPANY SYSTEM | CUSTOMER INFORMATION | ADDRESS | 1-1 NAKAI-TOWN, KASHIWA CITY | ROW NUMBER: 30 |
| B COMPANY SYSTEM | CREDIT CARD INFORMATION | NAME | HIROTOMO IKEN | ROW NUMBER: 20 |
| C COMPANY SYSTEM | MEDICINE COMPONENT INFORMATION | COMPONENT NAME | ACETYLAMINOPHEN | ROW NUMBER: 10 |
| ... | ... | ... | ... | ... |

482

RISK MANAGEMENT SUPPORT DEVICE

TECHNICAL FIELD

The present invention relates to a technique for easily recognizing data leakage from an information system.

BACKGROUND ART

In recent years, security risks in information systems have been increasing. For example, there are many cases of leakage of confidential information from information systems.

However, in the current situation where cyber attacks are becoming more sophisticated, measures against those cyber attacks alone are not enough to deal with the risks. It is also important to respond quickly to contingencies.

For example, even if confidential information is leaked, the damage can be reduced by taking early action.

CITATION LIST

Patent Literature

Patent Literature 1: JP 2019-096339 A
Patent Literature 2: JP 2019-016370 A

SUMMARY OF INVENTION

Technical Problem

However, in practice, even when confidential information is leaked, it is hard to recognize the leakage. In many cases, the situation is grasped after many months.

If the situation is left in this way, the confidential information widely spreads, and fraud based on the confidential information starts to be performed. Further, other confidential information may be leaked.

It is also effective to monitor data distributed externally as a method of grasping the leakage of confidential information at an early stage. However, it is not easy to find leaked confidential information because the external environment is complicated.

The present invention has been made based on the above problem recognition, and a main object of the present invention is to easily recognize a situation in which confidential information is leaked from an information system.

Solution to Problem

A risk management support device according to an aspect of the present invention is connected, via a communication network, to an information system that manages confidential information, and the device includes a fictitious code request receiving unit configured to receive, from the information system, a request to acquire a fictitious code to be set in a part of items in the confidential information as well as a type of the item, a fictitious code generation unit configured to generate the fictitious code corresponding to a data format of the received type of the item, and a fictitious code providing unit configured to transmit the generated fictitious code to the information system.

Advantageous Effects of Invention

According to the present invention, it is easy to recognize the situation where confidential information is leaked from an information system.

BRIEF DESCRIPTION OF DRAWINGS

FIG. 4 is a data structure diagram of a monitoring information table storage unit.

DESCRIPTION OF EMBODIMENTS

Figure 1:
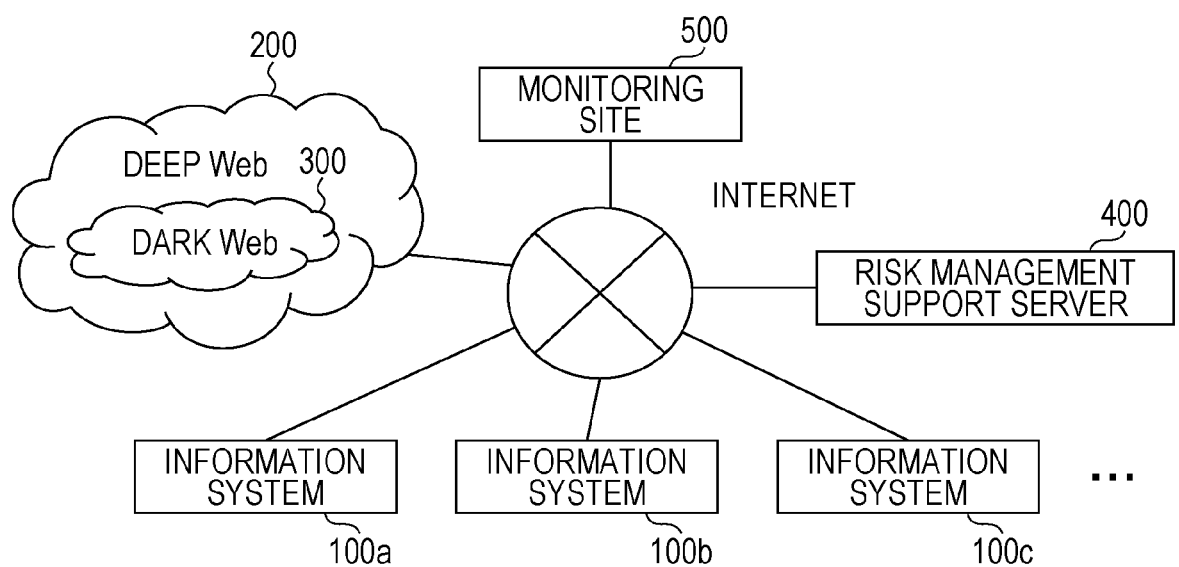
FIG. 1 is a diagram illustrating an outline of a network according to an embodiment.

FIG. 1 is a diagram illustrating an outline of a network according to an embodiment.

For example, information systems 100*a* to 100*c* operated by companies and public organizations are connected to the Internet. The information systems 100*a* to 100*c* and the like are generically referred to as an "information system 100" in a case where they are referred to collectively or are not particularly distinguished.

Assume that the information system 100 holds confidential information such as customer information, credit card information, and business secrets. The confidential information is, for example, information that is not scheduled to be disclosed on the Internet and is assumed to be used only in the intranet. In a case where the confidential information is stolen by a cyber attacker, the operator of the information system 100 will be damaged. In addition, it is conceivable that a person involved in a company or public organization may take out confidential information and perform fraudulent acts to divulge the information to a third party.

However, even in a case where the confidential information is leaked in this manner, the operator of the information system 100 does not often notice the leak soon. Finding traces of confidential information leaking out in the information system 100 is not always easy.

The leaked confidential information may be traded on a dark web 300 which is a part of a deep web 200. The deep web 200 is a concept that is compared with a surface web that discloses information that can be collected by a normal search engine. Programs called crawler, which are used by search engines, crawl the web and collect information, but cannot collect information from sites that do not allow information collection or sites that form dynamic links.

Information sources such as sites and databases that provide such difficult-to-collect information are called the deep web 200. Of the deep web 200, a site that is intended for or promotes fraudulent acts is called the dark web 300.

In a case where a person knows a Uniform Resource Locator (URL) of the site in dark web 300, the person can access the dark web 300 anonymously using a special browser and exchange data. A person who intends to steal a credit card can obtain another person's credit card information from the dark web 300. Furthermore, when a person tries to obtain inside information of a competitor, the person can also buy that information from the dark web 300. Cyber attackers may resell confidential information using such dark web 300. In this case, the leaked confidential information is disclosed as a transaction target in the dark web 300.

However, the existence of those sites on the dark web 300 is not easily recognized. This is because, while registering web page information collected by a crawler in a normal browser in a search database is referred to as "indexing", the dark web 300 cannot be indexed. Unknown sites cannot be reached by following a link, as in the surface web. Existence of a site is known through a unique acquisition route, such as getting a secret URL from someone familiar with the dark web 300. In other words, it is difficult to actually access the dark web 300 site without obtaining information on the underground.

Therefore, it is burdensome for an operator of the information system 100 to monitor the dark web 300 and find the leaked confidential information. A monitoring site 500 provides a service that monitors the dark web 300 and finds out data that satisfies the search condition among the data distributed on the dark web 300. The operator of the monitoring site 500 is familiar with the actual situation of the dark web 300 and has technical knowledge to access data that is generally difficult to obtain. In a case where the service of the monitoring site 500 is used, the target data can be searched for by presenting a search condition without recognizing the situation of the dark web 300.

According to the present embodiment, a mechanism for discovering confidential information leaked from the information system 100 at an early stage using the service of the monitoring site 500 is provided. Specifically, a fictitious code is set in advance to the confidential information held in the information system 100, and a risk management support server 400 requests the monitoring site 500 to monitor the dark web 300 using the fictitious code as a search condition. The fictitious code is not an actual code in the confidential information but a code set as a mark for detecting leakage of the confidential information. When the monitoring site 500 finds the fictitious code in the data distributed on the dark web 300, the risk management support server 400 is notified that the data including the fictitious code is distributed on the dark web 300. The risk management support server 400 notifies the information system 100 holding the confidential information including the fictitious code that the confidential information may be leaked. Since the information system 100 can recognize the leakage of the confidential information at an early stage, it becomes easy to take measures to suppress the spread of the damage.

However, in a case where the data found by the monitoring site 500 is circulated from another information source (for example, another information processing system 100), since it may be erroneously recognized that the confidential information has leaked from its own information system 100, it is needed not to confuse the data circulated from other information sources with own confidential information. Such a situation can occur when data circulated from another information source includes the same code as the fictitious code. Therefore, the fictitious code needs to be unique so as not to overlap with other data contents. In other words, it is desirable that the fictitious code is unique.

Figure 2:
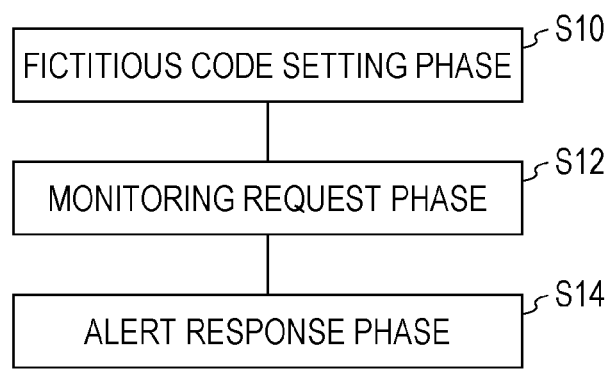
FIG. 2 is a diagram illustrating phases according to the embodiment.

FIG. 2 is a diagram illustrating phases according to an embodiment.

In a fictitious code setting phase (S10), a fictitious code is set in the confidential information held in the information system 100. There are several ways to set a fictitious code in confidential information. In the present embodiment and first to fourth modifications, examples of a fictitious code setting method will be described. The present embodiment will be described later with reference to FIG. 5.

In a monitoring request phase (S12), the risk management support server 400 specifies a fictitious code as a search condition to the monitoring site 500, and makes a search request for data disclosed on the dark web 300. The search request transmitted to the monitoring site 500 may be given a title specifying the case. In a case where a title is given, the title is given to an alert sent when the fictitious code is found. Using titles makes it easier to identify the case.

In response to the search request, the search for the fictitious code in the monitoring site 500 starts. Further, when the monitoring site 500 performs the search using a confidential information type as a clue, the confidential information type may be added to the search request. For example, in a case where a search is requested by designating "credit card information" as the confidential information type, the monitoring site 500 intensively searches the dark web 300 for a site that handles credit card information. Note that the search range may be the entire web. The search range may be the deep web 200.

In an alert response phase (S14), in a case where the monitoring site 500 finds the fictitious code in the data disclosed on the dark web 300, notification of an alert is given to the risk management support server 400. Upon receiving the alert notification, the risk management support server 400 notifies the information system 100 that the confidential information may be leaked because the fictitious code has been found on the dark web 300. This notification corresponds to a data leakage warning.

Next, details of the processing in the risk management support server 400 will be described.

Each component of the risk management support server 400 includes an arithmetic unit such as a central processing unit (CPU) and various coprocessors, a storage device such as a memory and a storage, hardware including a wired or wireless communication line connecting the arithmetic unit and a storage device, and software that is stored in the device and supplies processing instructions to the arithmetic unit. Computer programs may be configured by a device driver, an operating system, various application programs located in an upper layer thereof, and a library that provides a common function to these programs. Each block described below is not a hardware unit configuration but a functional unit block.

Figure 3:
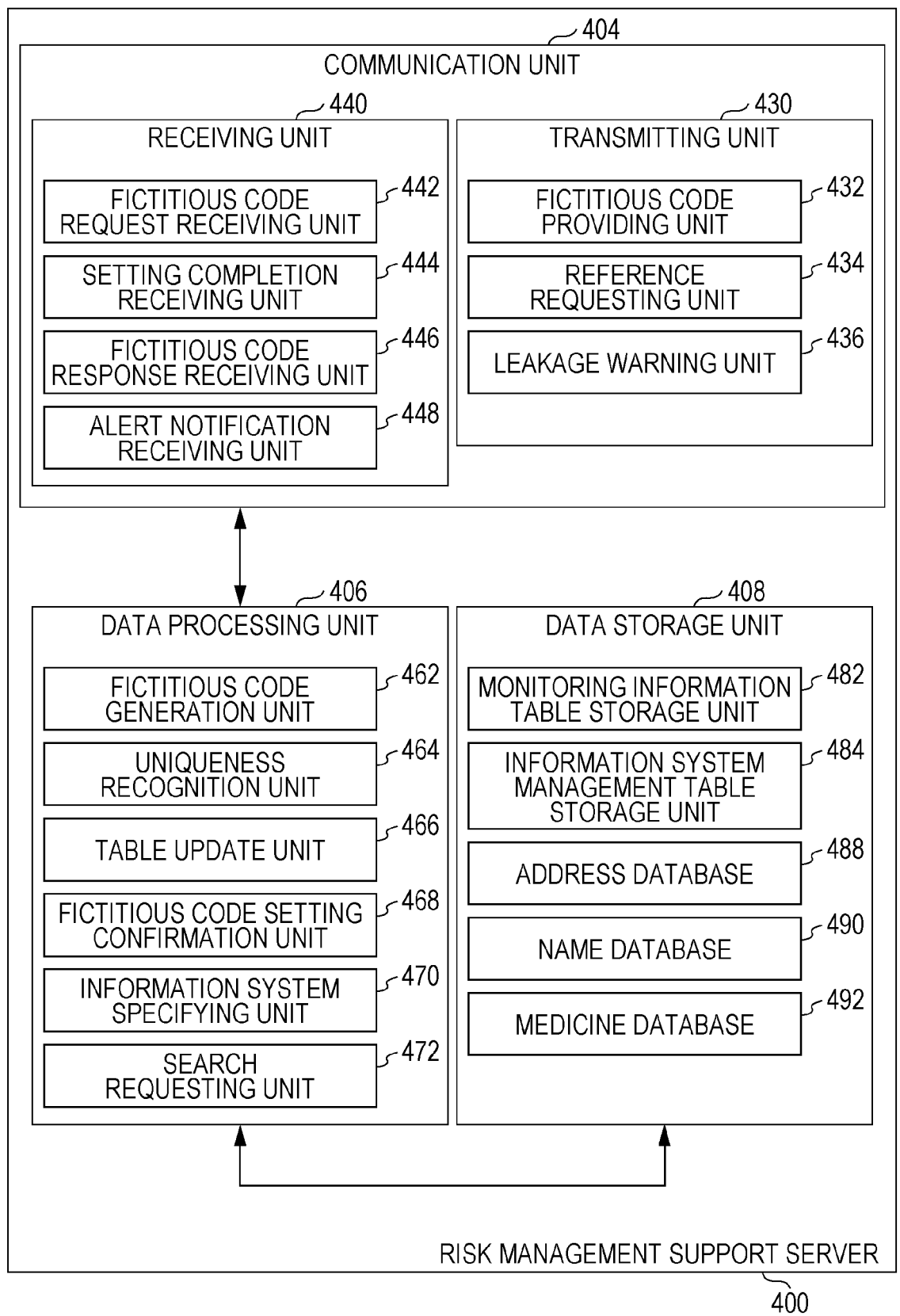
FIG. 3 is a functional block diagram of a risk management support server.

FIG. 3 is a functional block diagram of the risk management support server 400.

The risk management support server 400 includes a communication unit 404, a data processing unit 406, and a data storage unit 408.

The communication unit 404 performs communication processing between the information system 100 and the monitoring site 500 via the Internet. The data storage unit 408 stores various data. The data processing unit 406 performs various processes based on the data acquired by the communication unit 404 and the data stored in the data storage unit 408. The data processing unit 406 also functions as an interface between the communication unit 404 and the data storage unit 408.

The communication unit 404 includes a transmitting unit 430 that transmits data, and a receiving unit 440 that receives data.

The transmitting unit 430 includes a fictitious code providing unit 432, a reference requesting unit 434, and a leakage warning unit 436.

The fictitious code providing unit 432 provides a fictitious code to the information system 100. The reference requesting unit 434 requests the information system 100 to refer to the fictitious code. The leakage warning unit 436 warns the information system 100 that the confidential information may be leaked.

The receiving unit 440 includes a fictitious code request receiving unit 442, a setting completion receiving unit 444, a fictitious code response receiving unit 446, and an alert notification receiving unit 448.

The fictitious code request receiving unit 442 receives a fictitious code request from the information system 100. The setting completion receiving unit 444 receives a setting completion from the information system 100. The fictitious code response receiving unit 446 receives a fictitious code response from the information system 100. The alert notification receiving unit 448 receives an alert notification from the monitoring site 500.

The data processing unit 406 includes a fictitious code generation unit 462, a uniqueness recognition unit 464, a table update unit 466, a fictitious code setting confirmation unit 468, an information system specifying unit 470, and a search requesting unit 472.

The fictitious code generation unit 462 generates a fictitious code. The uniqueness recognition unit 464 recognizes the uniqueness of the fictitious code. The table update unit 466 updates a monitoring information table. The fictitious code setting confirmation unit 468 confirms the setting status of the fictitious code. The information system specifying unit 470 specifies an information system 100 to which a warning is issued. In the monitoring request phase (S12), the search requesting unit 472 requests the monitoring site 500 to search for the data disclosed on the dark web 300 by designating the fictitious code as a search condition.

The data storage unit 408 includes a monitoring information table storage unit 482, an information system management table storage unit 484, an address database 488, a name database 490, and a medicine database 492.

The monitoring information table storage unit 482 stores the monitoring information table. The monitoring information table will be described later with reference to FIG. 4. The information system management table storage unit 484 stores an information system management table. The information system management table has a record corresponding to each information system 100. In the record, a name of the information system 100, an IP address, a URL of the homepage, a mail address of an administrator terminal, and the like are set. The address database 488 stores information related to an address in Japan. The address database 488 has a function of searching for an existing address description. The name database 490 stores information related to a name of a Japanese. The name database 490 has a function of searching for an existing name, a family name, and a so-called given name (hereinafter simply referred to as "first name"). The medicine database 492 stores information related to a component of medicine. The medicine database 492 has a function of searching for an existing component name.

FIG. 4 is a data structure diagram of the monitoring information table storage unit 482.

The monitoring information table manages cases for which monitoring of confidential information has been requested. In other words, the monitoring information table records what kind of fictitious code is set for which item in which position in order to beware leakage of which information in the information system 100. For this purpose, a record is provided for each case for which a search request is made to the monitoring site 500. The record has fields of information systems 100, confidential information types, item types, fictitious codes, and setting position information. The field for the information system 100 stores a name of the information system 100. The confidential information type field stores a type of confidential information that is the subject of security alert. The confidential information type is, for example, customer information, credit card information, medicine component information, and the like. Medicine component information is a kind of business secrets. The confidential information type is arbitrary and is not limited to the illustrated types. The item type field stores a type of the item for which the fictitious code is set. The item for which the fictitious code is set is one of the items managed as a vertical row (column) in the confidential information. Note that, in this example, the confidential information is described as data in a matrix format, but the format of the confidential information is arbitrary. The fictitious code field stores a fictitious code set in the confidential information.

In a case where the type of the confidential information is customer information, items such as name, gender, address, and telephone number are included, and items suitable for setting the fictitious code are, for example, the name, address, and telephone number. For example, in a case where a name includes a non-existent family name or first name, the same name is hardly supposed and its uniqueness may be recognized; however, the gender is categorized into only for men and women and has no uniqueness as information.

Furthermore, among the items such as name, card number, and expiration date in the credit card information, name and card number are suitable for setting a fictitious code, but the expiration date is not suitable for setting a fictitious code. The card number has to be unique in the first place, and does not overlap with that of different credit card information. In contrast, regarding the expiration date, there are many credit cards that expire at the same time, and many credit card information is duplicated and has no uniqueness.

Among the items such as a component name and a composition ratio in the medicine component information, the component name is suitable for setting a fictitious code, but the composition ratio is not suitable for setting a fictitious code. In a case where a non-existent component name is used, it does not overlap with other medicine component information, but the composition ratio is not unique because the composition ratio is arbitrary and may overlap with the value of the composition ratio in other medicine component information.

The setting position information field stores information for specifying the area where the fictitious code is set. As described above, all the confidential information exemplified here is data in a matrix format. Rows correspond to records, and vertical rows correspond to columns. Here, the description will be made using "rows" and "vertical rows" in order to avoid confusion with the records and fields of the setting position information and to simplify the description. Each item described above corresponds to a predetermined vertical row in the confidential information. Then, the row of the confidential information is specified by a row number, and the vertical row of the confidential information is specified by the item type. Therefore, when the row number is specified, the area where the fictitious code is set is specified, and thus only the row number needs to be used as the setting position information. However, the area where the fictitious code is set may be specified, based on other information such as a data address (for example, the number of bytes from the head) and the data size (for example, the number of bytes indicating the data length).

For example, the first record indicates that, in "customer information" of confidential information held by an information system 100a called "A company system," a fictitious code of "1-1 Nakai town, Kashiwa city" is set as an item "address" in a row with a row number "30." "Nakai town, Kashiwa city" is a non-existent address. Although the fictitious codes exemplified here will be described in detail later, all of the fictitious codes are recognized to be unique. It is desirable that a fictitious code is unique while being difficult for a person who illegally makes an access to found out the code being a fictitious code. Furthermore, in order to guarantee uniqueness, it is preferable to use non-existent data such as "Nakai town, Kashiwa city."

The second record indicates that, in the "credit card information" of confidential information held by an information system 100b called "B company system," a fictitious code of "Hirotomo Igata" is set in an item "name" in a row with a row number "20."

The third record indicates that, in "medicine component information" of confidential information held by an information system 100c called "C company system," a fictitious code of "Acetylaminophen" is set in an item "component name" in a row with a row number "10."

Note that, a plurality of records may be provided for the same information system 100 in a case where it is needed to beware of leakage of more than one pieces of confidential information in one information system 100. For example, there is a case where it is needed to beware leakage of both the confidential information "customer information" and the confidential information "credit card information" in the information system "A company system" by setting a fictitious code for each information.

Furthermore, a plurality of fictitious codes may be set for one piece of confidential information of one information system 100. Here are three examples.

As a first example, in the confidential information "customer information" of the information system "A company system," a fictitious code "1-1 Nakai town, Kashiwa city" may be set in an item "address" in a row with a row number "15," and another fictitious code "1-1 Yayoi town, Matsudo city" may be set in an item "address" in another row with a row number "25." In this case, two records having common information system ("A company system"), confidential information type ("customer information"), and item type ("address") are generated. The records include different fictitious codes and different setting position information.

As a second example, in the confidential information "customer information" of the information system "A company system," the fictitious code of "1-1 Nakai town, Kashiwa city" may be set in the item "address" in the row with the row number "15," and another fictitious code "Hirotomo Igata" may be set in the item "name" in another row with the row number "25." In this case, two records having common information system ("A company system") and the confidential information type ("customer information") are generated. The records include different item types, different fictitious codes, and different setting position information.

As a third example, in the confidential information "customer information" of the information system "A company system," the fictitious code "1-1 Nakai town, Kashiwa city" may be set in the item "address" in the row with the row number "15," and the another fictitious code "Hirotomo Igata" may be set in an item "name" in the row with the same row number "15." In this case, two records having common information system ("A company system"), confidential information type ("customer information"), and setting position information ("row number: 15") are generated. The records incudes different item types and different fictitious codes.

Figure 5:
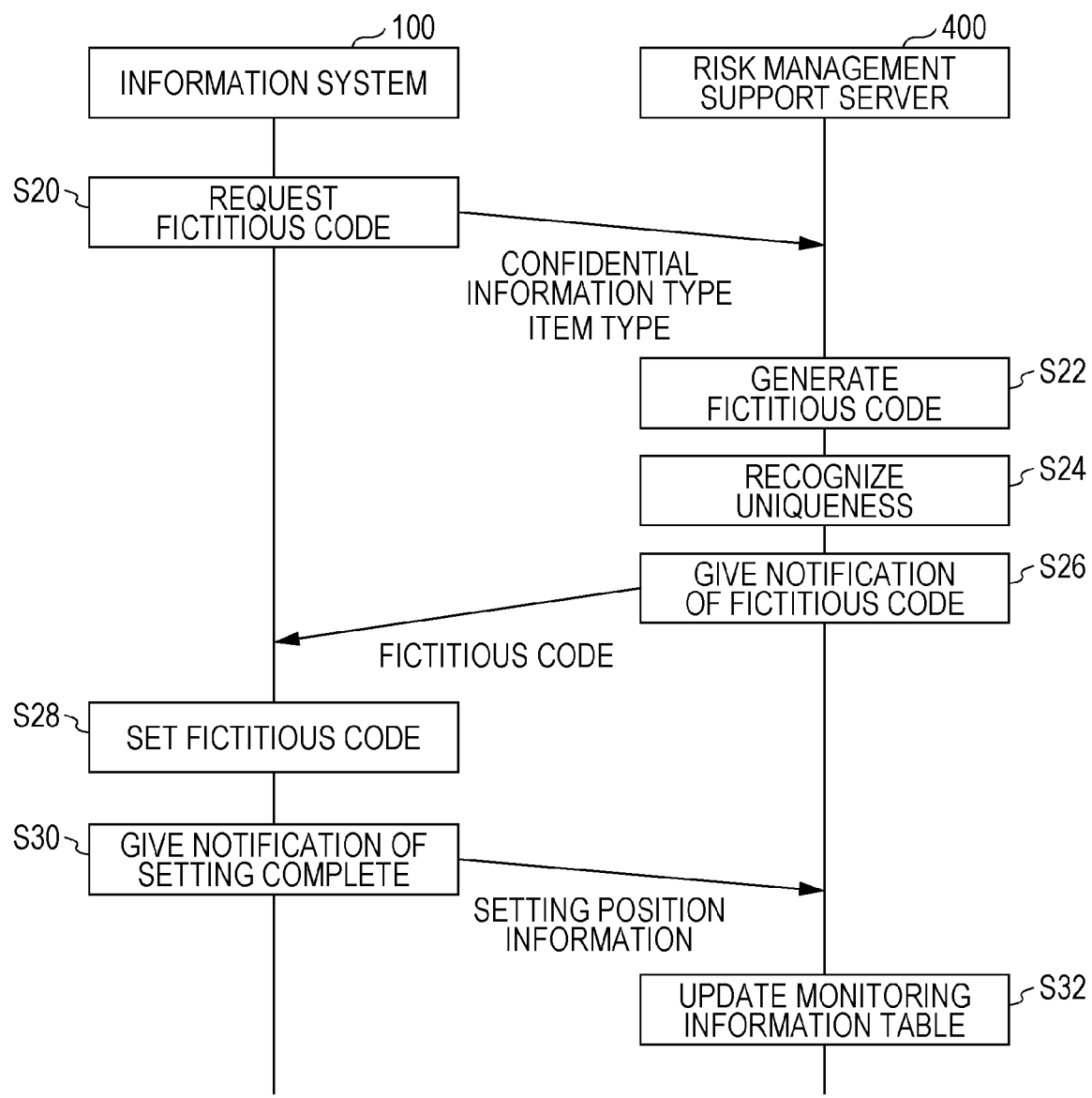
FIG. 5 is a sequence diagram of a fictitious code setting phase (S10) according to the embodiment.

FIG. 5 is a sequence diagram of the fictitious code setting phase (S10) according to the embodiment.

Here, description will be made assuming that a fictitious code is set in the item of the address in the customer information. An administrator of the information system 100 requests a fictitious code from an administrator terminal of the information system 100 (S20). Specifically, the administrator terminal transmits, to the risk management support server 400, e-mail in which the confidential information type "customer information" and the item type "address" are set according to a predetermined form for a fictitious code request. Alternatively, the administrator terminal may log in to a website of the risk management support server 400 and input the confidential information type and the item type on the web page for fictitious code request, and the browser may transmit the confidential information type and the item type.

When the fictitious code request receiving unit 442 of the risk management support server 400 receives the fictitious code request, the fictitious code generation unit 462 generates a fictitious code according to the item type specified in the fictitious code request (S22).

In a case where the item type is "address," a fictitious code looks like an address is generated. Although a method of generating a fictitious code looks like an address is arbitrary, a method of combining fictitious codes from sample codes of a plurality of addresses is exemplified here. The sample code corresponds to an actual address notation. For example, it is assumed that "Δ-□ Yayoi town, Kashiwa city," "o-x Nakai town, Matsui city," and "1-1 ∇-town, Tokorozawa city" are obtained as sample codes of addresses. These are all real addresses. The source of the sample codes for the address is arbitrary. The sample codes may be obtained from the address database 488 or may be obtained from the customer information. From the first sample code, the city notation "Kashiwa city" is extracted. From the second sample code, the town notation "Nakai town" is extracted. From the third sample code, the notation of the area number and house number "1-1" is extracted. Then, the extracted city notation "Kashiwa city," the town notation "Nakai town," and the area and house number notation "1-1" are connected and a combined address "1-1 Nakai town, Kashiwa city" is generated. Although "1-1 Nakai town, Kashiwa city" in this example is a non-existent address, the generated address may exist in some cases. The existing address is not adopted in the uniqueness recognition process described later.

In a case where the item type is "name," a fictitious code looks like a name is generated. Although a method of generating a fictitious code looks like a name is arbitrary, a fictitious code may be combined from sample codes of a plurality of names. The sample code corresponds to an existed name or an existing name. For example, it is assumed that "Hirobumi Ito" and "Aritomo Yamagata" are obtained as sample codes of names. The source of the sample code of name is arbitrary. The sample codes may be obtained from the name database 490 or obtained from the credit card information. The family names and first names are generated separately. First, a family name is generated. From the first sample code, a first character "i" of a family name is extracted. From the second sample code, a second character "gata" of a family name is extracted. Then, the extracted first character "i" of the extracted family name and the second character "gata" of the last name are connected and a combined family name "Igata" is generated. Next, a first name is generated. From the first sample code, a first character "biro" of a first name is extracted. From the second sample code, a second character "tomo" of a first name is extracted. Then, the extracted first character "biro" of the first name and the second character "tomo" of the first name are connected and a combined name "Hirotomo" is generated. Then, the combined family name "Igata" and the combined first name "Hirotomo" are connected and a combined name "Hirotomo Igata" is generated. The name generated in this manner may match an existing name. A name that is likely to exist is not adopted in the uniqueness recognition process described later.

Furthermore, in a case where the item type is "component name," a fictitious code looks like a component name is generated. Although a method of generating a fictitious code looks like a component name is arbitrary, a fictitious code may be combined from sample codes of a plurality of component names. The sample code corresponds to an existing component name. For example, it is assumed that "acetylsalicylic acid" and "acetaminophen" are obtained as sample codes of component names. Both of the component names are the name of an existing medicine and are used as a component name. The source of the sample code of the component name is arbitrary. The component name may be obtained from the medicine database 492 or may be obtained from medicine component information. From the first sample code, a first part of the component name, "acetyl" is extracted. From the second sample code, a later part of the component name, "aminophen" is extracted. Then, the first part "acetyl" of the extracted component name and the later part "aminophen" of the same component name are connected and a combined component name "acetylaminophen" is generated. "Acetylaminophen" in this example is a non-existent component name; however, the generated component name may exist. An existing component name is not adopted in the uniqueness recognition process described later.

As described above, since the fictitious code combined based on existing sample codes is difficult to be recognized as false information at first glance, it is hardly assumed that the fictitious code is removed in the dark web 300. Therefore, such a fictitious code is likely to function as a trace of leakage of the confidential information.

The uniqueness recognition unit 464 of the risk management support server 400 recognizes the uniqueness of the generated fictitious code (S24).

In a case where the fictitious code is a fictitious code related to the item type "address," when a code that matches the fictitious code is not included in a large number of sample codes of addresses, it is recognized that the fictitious code is unique. When the code that matches the fictitious code is included in a large number of sample codes of addresses, it is recognized that the fictitious code is not unique. For example, as a result of searching in the address database 488 using the fictitious code as a search key, when there is no address that matches the fictitious code, it is recognized that the fictitious code is unique. On the other hand, when there is an address that matches the fictitious code, it is recognized that the fictitious code is not unique. The search may be performed with a fictitious code as a search key by using a web service such as a postal code search site or an address search site. In this case, when an address that matches the fictitious code is not found in these sites, it is recognized that the fictitious code is unique. On the other hand, when an address that matches the fictitious code is found, it is recognized that the fictitious code is not unique.

In a case where the code is a fictitious code related to the item type "name," it is determined whether or not a code that matches the fictitious code is included in a large number of sample codes of names. However, since the combination of the family name and the first name is highly arbitrary, even when the same name does not exist as a whole, when the family name and the first name exist respectively, there is no doubt that the name combining the two actually exists. Therefore, uniqueness is determined separately for the family name and the first name, and, when it is determined that either the last name or the first name is unique, it is recognized that the fictitious code is unique. The information source containing a large number of sample codes of names is, for example, the name database 488. In the name database 488, when a search is performed using the last name in the fictitious code as a search key and there is no last name that corresponds to the last name, it is recognized that the fictitious code is unique. In addition, as a result of searching in the name database 488 using the name in the fictitious code as a search key, when there is no name that corresponds to the name, it is recognized that the fictitious code is unique. In a case where same names as the family name and the first name are found, it is recognized that the fictitious code is not unique. Web services such as a personal name search site and a social networking service (SNS) site may be used. The method of recognition is the same as the case of using the name database 488.

In a case where the code is a fictitious code related to the item type "component name," when the code that matches the fictitious code is not included in a large number of sample codes of component names, it is recognized that the fictitious code is unique. In a case where a code that matches the fictitious code is included in a large number of sample codes of component names, it is recognized that the fictitious code is not unique. For example, in a case where there is no component name that matches the fictitious code as a result of searching in the medicine database 488 using a fictitious code as a search key, it is recognized that the fictitious code is unique. On the other hand, in a case where there is a component name that matches the fictitious code, it is recognized that the fictitious code is not unique. The search may be performed with a fictitious code as a search key by using a web service such as a medicine search site or a pharmaceutical information site. In this case, in a case where a component name that matches the fictitious code is not found in these sites, it is recognized that the fictitious code is unique. On the other hand, in a case where a component name that matches the fictitious code is found, it is recognized that the fictitious code is not unique.

The uniqueness recognition unit 464 further recognizes that the generated fictitious code is not unique in a case where it is determined that the fictitious code corresponds to the currently used fictitious code or the fictitious code used in the past.

In a case where it is recognized that the fictitious code is not unique, the process returns to S22 to generate another fictitious code. In a case where it is recognized that the fictitious code is unique, the fictitious code providing unit 432 of the risk management support server 400 transmits the fictitious code to the administrator terminal of the information system 100 (S26). The notification may be sent by e-mail, or the fictitious code may be posted on a fictitious code providing web page that can be browsed by logging in to the web site of the risk management support server 400 from the administrator terminal. In the latter case, the risk management support server 400 posts the fictitious code generated in S26 on a dedicated website. The administrator of the information system 100 may obtain the fictitious code by accessing this dedicated website.

When the administrator terminal of the information system 100 receives the fictitious code, the administrator of the information system 100 operates the manager terminal to set the fictitious code in the confidential information held in the information system 100 (S28). The row for setting the fictitious code may be arbitrarily determined. The administrator notifies the risk management support server 400 of the setting completion from the administrator terminal (S30). The number of the row in which the fictitious code is set is added to the setting completion notification as setting position information. The notification may be sent by e-mail, or the setting completion may be notified by the browser by logging in to the website of the risk management support server 400 from the administrator terminal and inputting the setting completion on the setting completion notification web page.

When the setting completion receiving unit 444 of the risk management support server 400 receives the setting completion notification, the table update unit 466 updates the monitoring information table (S32). Specifically, a new record is provided in the monitoring information table, and the confidential information type, the item type, the fictitious code, and the setting position information are set.

After the above setting, the risk management support server 400 causes the monitoring site 500 to periodically search for the fictitious code using the fictitious code as a search condition (monitoring request phase (S12) in FIG. 2).

Figure 6:
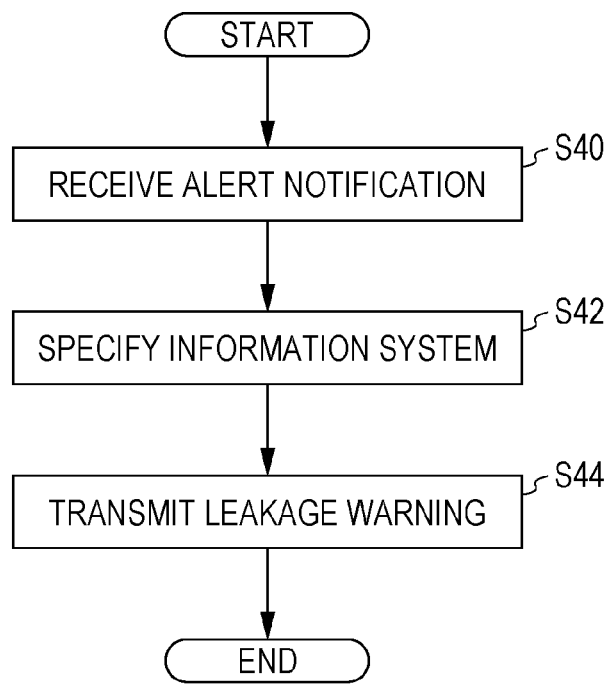
FIG. 6 is a sequence diagram of an alert response phase (S14) according to the embodiment.

FIG. 6 is a sequence diagram of the alert response phase (S14) according to an embodiment.

In a case where data including a fictitious code in the dark web 300 is found, the monitoring site 500 sends an alert notification to the risk management support server 400. The alert notification may be sent by e-mail, or the alert may be posted on a web page for the search requester provided by the monitoring site 500. The alert notification includes the detected fictitious code and information on the site where the data including the fictitious code exists. In a case where a title is given in the search request, the title is also added to the alert notification.

In a case where the alert notification receiving unit 448 of the risk management support server 400 receives the alert notification from the monitoring site 500 (S40), the information system specifying unit 470 refers to the monitoring information table and specifies information system 100 corresponding to the fictitious code included in the alert notification (S42). In a case where the information system name is set in the title, the information system 100 may be specified by the title.

The leakage warning unit 436 of the risk management support server 400 transmits a leakage warning notifying that the confidential information may be leaked to the administrator terminal of the information system 100 (S44).

The waning may be sent by e-mail, or the leakage warning may be posted on a leakage warning web page that can be referred to by logging in to the web site of the risk management support server 400 from the administrator terminal. The leakage warning includes the confidential information type, item type, fictitious code, setting position information, and information on a site where data including the fictitious code exists.

In a case where the administrator terminal of the information system 100 receives the leakage warning, the administrator refers to the contents of the leakage warning and considers a countermeasure.

Figure 7:
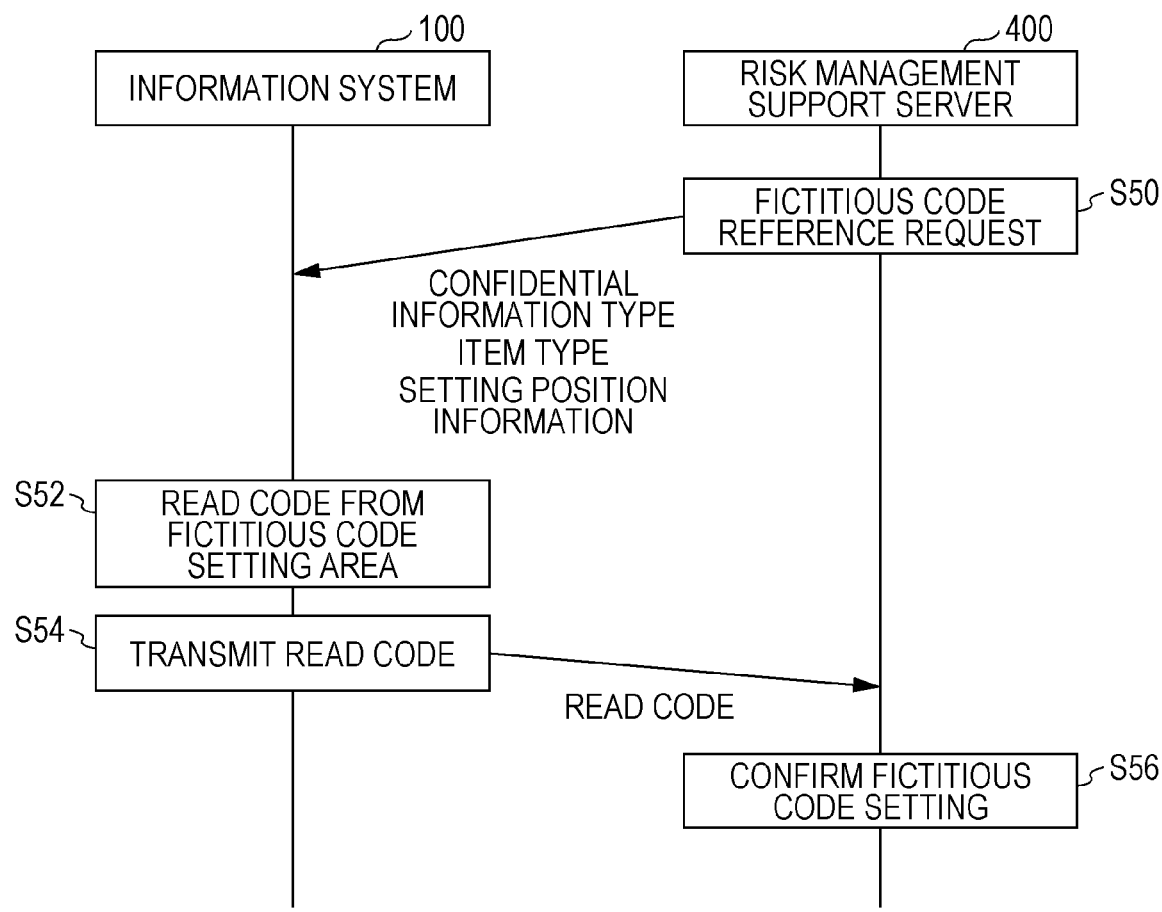
FIG. 7 is a sequence diagram for confirming a fictitious code setting according to the embodiment.

FIG. 7 is a sequence diagram of a fictitious code setting confirmation according to one embodiment.

Since the fictitious code is basically unnecessary information in the operation of the information system 100, the operator of the information system 100 may rewrite or delete the fictitious code. Therefore, the risk management support server 400 periodically checks the setting status of the fictitious code in the information system 100.

The reference requesting unit 434 of the risk management support server 400 requests the information system 100 to refer to the fictitious code by designating the confidential information type, the item type, and the setting position information (S50). Specifically, an interface (for example, web application programming interface (API)) used to refer to the internal data of the information system 100 is requested to refer to the fictitious code. Note that it is assumed that the risk management support server 400 has authority to refer to the internal data of the information system 100. The access authority via this interface needs to be managed with particular care. This is to prevent cyber attackers from using this interface to steal confidential information.

In response to the reference request, the information system 100 extracts the code stored in the fictitious code setting area from the confidential information (S52) and transmits the code to the risk management support server 400 (S54).

When the fictitious code response receiving unit 446 of the risk management support server 400 receives the fictitious code, the fictitious code setting confirmation unit 468 confirms whether the received code matches the fictitious code (S56). In a case where the received code matches the fictitious code, the confirmation is successful. In a case where the received code does not match the fictitious code, the confirmation fails. In a case where the confirmation fails, the fictitious code setting confirmation unit 468 warns the administrator of the information system 100 that the fictitious code has disappeared. Specifically, e-mail may be sent to the administrator terminal of the information system 100 to warn the disappearance of the fictitious code, or warning of the fictitious code disappearance may be posted on a fictitious code disappearance warning web page that can be referred to by logging in to a website of the risk management support server 400 from the administrator terminal. The administrator who received the warning about the disappearance of the fictitious code considers to take measures such as resetting the fictitious code.

First Modification

In the embodiment, the example in which the fictitious code is generated in the risk management support server 400 (see FIG. 5) has been described; however, in the first modification, the fictitious code is generated in the information system 100.

In a case of the first modification, the receiving unit 440 of the risk management support server 400 further includes a fictitious code notification receiving unit (not illustrated), and the transmitting unit 430 further includes a uniqueness confirmation notification unit (not illustrated).

Figure 8:
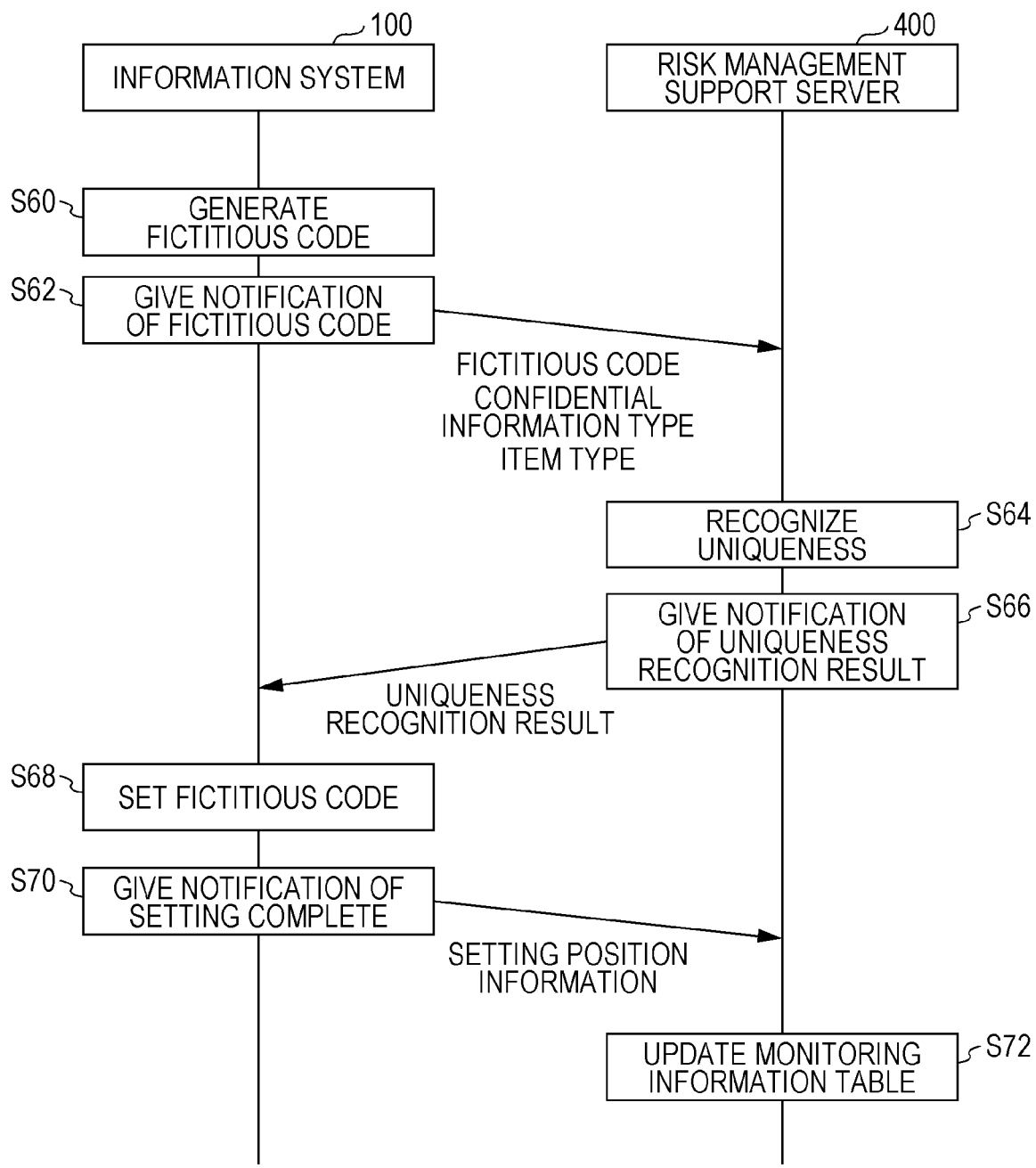
FIG. 8 is a diagram illustrating a sequence of a fictitious code setting phase (S10) according to a first modification.

FIG. 8 is a diagram illustrating a sequence of a fictitious code setting phase (S10) according to the first modification.

The administrator of the information system 100 generates a fictitious code according to the item type for which the fictitious code is set (S60). The method of generating the fictitious code is arbitrary. In the information system 100, the fictitious code may be generated in the same manner as in the risk management support server 400 according to the embodiment.

The administrator of the information system 100 sends, to the risk management support server 400, a fictitious code notification including the fictitious code, the confidential information type, and the item type from the administrator terminal (S62). The notification may be sent by e-mail, or notified by a browser of the fictitious code, the confidential information type, and the item type after logging in to the website of the risk management support server 400 from the administrator terminal and inputting the fictitious code, the confidential information type, and the item type on the fictitious code notification web page.

When the fictitious code notification receiving unit of the risk management support server 400 receives the fictitious code notification, the uniqueness recognition unit 464 of the risk management support server 400 recognizes the uniqueness of the fictitious code (S64). The uniqueness confirmation notification unit transmits a notification of the recognition result regarding the uniqueness to the administrator terminal of the information system 100 (S66). This notification may indicate a recognition result that the fictitious code is unique, or may indicate a recognition result that the fictitious code is not unique. The recognition result regarding the uniqueness may be sent by e-mail, or the recognition result may be posted on a uniqueness recognition result web page that can be referred to by logging in to the website of the risk management support server 400 from the administrator terminal.

In a case where the administrator terminal of the information system 100 receives the notification indicating the result of the recognition that the fictitious code is not unique, the process returns to S60, generates another fictitious code, and repeats the above described procedure.

In a case where the administrator terminal of the information system 100 receives the notification indicating the result of the recognition that the fictitious code is unique, the administrator of the information system 100 sets the fictitious code in an area specified by the item type and the setting position information (record ID) in the confidential information (S68). The administrator of the information system 100 transmits a setting completion notification including the setting position information to the risk management support server 400 from the administrator terminal (S70).

When the setting completion receiving unit 444 of the risk management support server 400 receives the setting completion notification, the table update unit 466 updates the monitoring information table (S72).

The confirmation of the fictitious code setting is similar to that of the embodiment.

Second Modification

In the embodiment, the example in which the fictitious code is set in the information system 100 (see FIG. 5) has been described; however, in the second modification, the fictitious code is set in the risk management support server 400. Therefore, the risk management support server 400 acquires the confidential information from the information system 100, sets the fictitious code, and then returns the updated confidential information to the information system 100.

In the case of the second modification, the receiving unit 440 of the risk management support server 400 further includes a confidential information receiving unit (not illustrated), the transmitting unit 430 further includes a confidential information returning unit (not illustrated), and the data processing unit 406 further includes a fictitious code setting unit (not illustrated).

Figure 9:
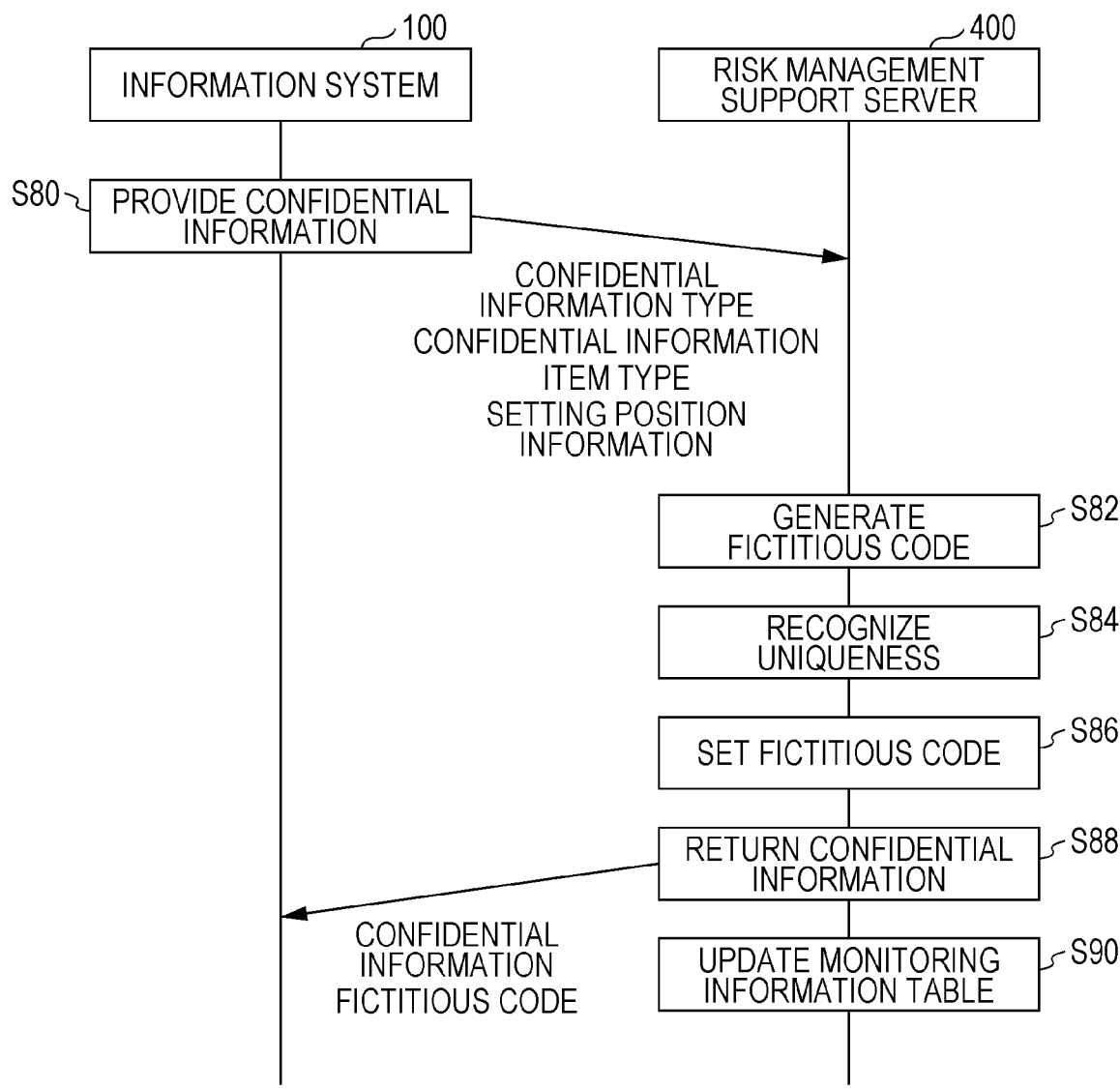
FIG. 9 is a diagram illustrating a sequence of a fictitious code setting phase (S10) according to a second modification.

FIG. 9 is a diagram illustrating a sequence of a fictitious code setting phase (S10) according to the second modification.

The administrator of the information system 100 encrypts the confidential information, and transmits the encrypted confidential information, the confidential information type, the item type, and the setting position information to the risk management support server 400 from the administrator terminal (S80). The encrypted confidential information may be attached to mail in which the confidential information type, item type, and setting position information are described and transmitted, or may be transmitted the confidential information, the confidential information type, the item type, and the setting position information using an encrypted communication technology. Alternatively, those may be provided using a recording medium.

When the confidential information receiving unit of the risk management support server 400 receives the encrypted confidential information, the confidential information type, the item type, and the setting position information, the confidential information is decrypted.

The fictitious code generation unit 462 of the risk management support server 400 generates a fictitious code according to the item type (S82). The uniqueness recognition unit 464 recognizes the uniqueness of the generated fictitious code (S84). In a case where it is recognized that the fictitious code is not unique, the process returns to S82, another fictitious code is generated, and recognition related to the uniqueness is performed again. In a case where it is recognized that the fictitious code is unique, the fictitious code setting unit sets the fictitious code in an area specified by the item type and the setting position information (record ID) in the confidential information (S86). The confidential information returning unit (not illustrated) encrypts the updated confidential information and returns the updated confidential information to the information system 100 (S88). The encrypted confidential information may be attached to e-mail and transmitted, or the confidential information, the confidential information type, the item type, and the setting position information may be transmitted using an encrypted communication technology. Alternatively, the confidential information may be returned using a recording medium. The administrator of the information system 100 stores the returned confidential information in an original area in the information system 100.

The table update unit 466 of the risk management support server 400 updates the monitoring information table (S90).

Here, in a case where an interface (for example, WebAPI) for updating the internal data of the information system 100 is provided, the risk management support server 400 may directly set the fictitious code in the confidential information held in the information system 100. It is assumed that the risk management support server 400 has authority to update the internal data of the information system 100. Here, this access authority needs to be managed with particular care. This is to prevent cyber attackers from using this interface to falsify confidential information.

The confirmation of the fictitious code setting is similar to that of the embodiment.

Third Modification

In the cases of the embodiment, the first modification, and the second modification, the process of generating the confidential information is arbitrary. The confidential information may be information generated inside the information system 100. For example, in a case where confidential information is a business secret, the information is generated inside the information system 100.

On the other hand, confidential information may be generated based on information acquired from outside. For example, in the case of information for managing a registered member (hereinafter, referred to as "registered member management information"), personal information, such as a name and an address, input by a general user who intends to register as a member on a web page of the information system 100 is stored as information of individual member (hereinafter, referred to as "member information").

In the third modification, assuming a case where contents to be added to confidential information can be specified from a publicly available web page, such as a member registration, a fictitious code is input from the risk management support server 400 as contents to be added to the confidential information. In the example described below, a fictitious member is registered from the risk management support server 400 in a similar manner as the procedure when a general user performs a member registration. The member information of a fictitious member is provided for the purpose of setting a fictitious code, and therefore is basically unnecessary in the operation of the information system 100. Therefore, the registration of a fictitious member must be approved by the administrator of the information system 100.

For example, when "1-1 Nakai town, Kashiwa city" is input in the address input field on the web page for member registration for registration of a fictitious member, the "1-1 Nakai town, Kashiwa city" is set as a fictitious code in the address item in the member information. In other words, the information system 100 can respond in a normal operation state.

In the case of the third modification, the fictitious code can be set only by the operation from the risk management support server 400. When setting a fictitious code in the address item, an address notation whose uniqueness is recognized, such as "1-1 Nakai town, Kashiwa city" is set Although fictitious contents are set for other items, these contents do not need to be unique. For example, the name may be a common name such as "Taro Yamamoto." In this case, the name "Taro Yamamoto" is not used for monitoring the dark web 300, and the address "1-1 Nakai town, Kashiwa city" is used for monitoring the dark web 300.

Conversely, in a case where a fictitious code is set in the name field, a unique name with recognized uniqueness such as "Hirotomo Igata" is entered in the name input field. Items other than the name do not need to be unique. Therefore, a real place name such as "Yayoi town, Kashiwa city" may be used as the address notation input in the address input field. In this case, the address " . . . Yayoi town, Kashiwa city" is not used for monitoring the dark web 300, and the name "Hirotomo Igata" is used for monitoring the dark web 300.

In the case of the third modification, the data processing unit 406 of the risk management support server 400 further includes a fictitious code setting unit (not illustrated), and the transmitting unit 430 further includes a fictitious member registration request unit (not illustrated) and a fictitious member information presentation request unit (not illustrate), and the receiving unit 440 further includes an authentication result receiving unit (not illustrated), a registration completion receiving unit (not illustrated), and a fictitious member information receiving unit (not illustrated).

Figure 10:
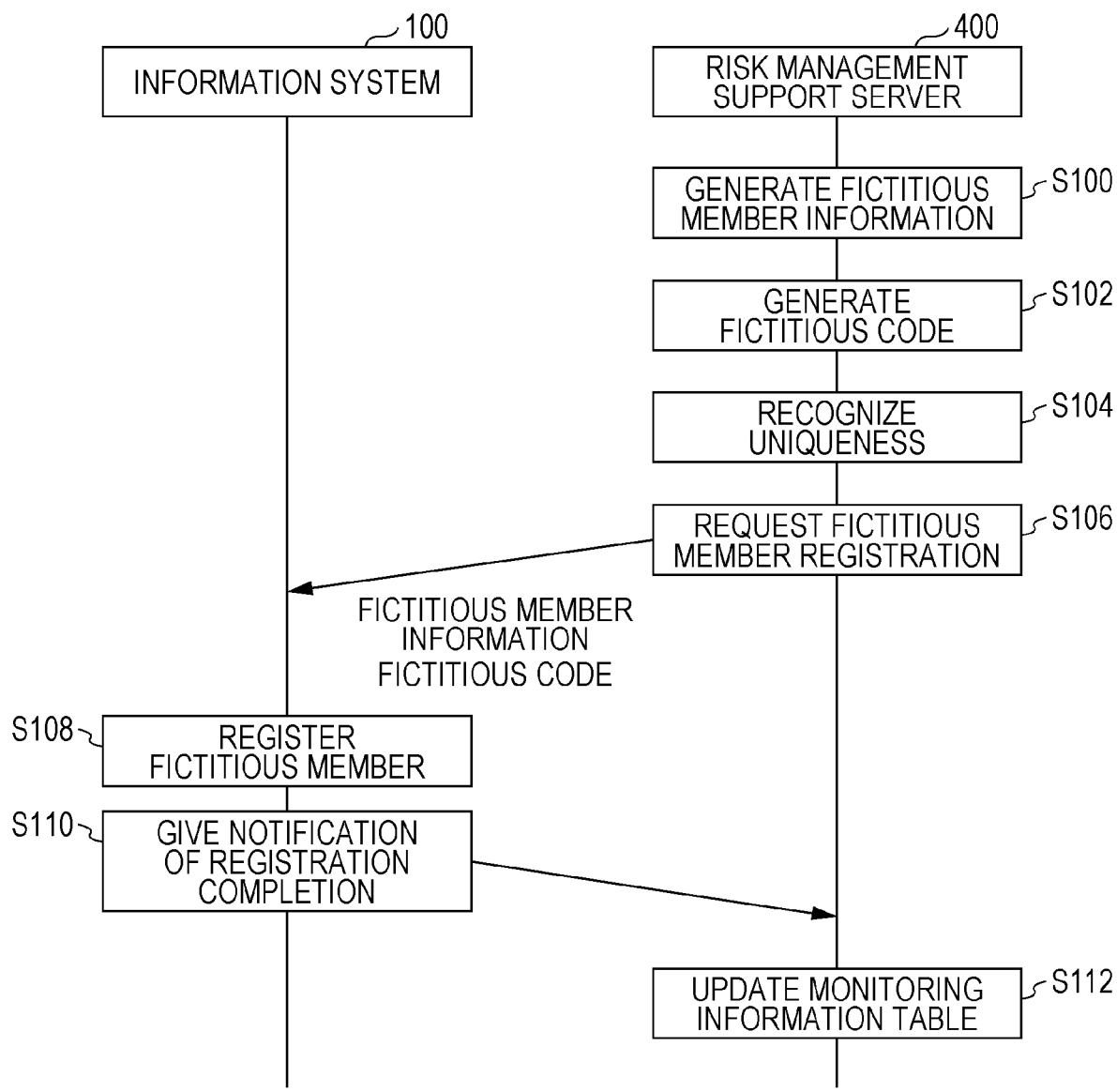
FIG. 10 is a diagram illustrating a sequence of a fictitious code setting phase (S10) according to a third modification.

FIG. 10 is a diagram illustrating a sequence of a fictitious code setting phase (S10) according to the third modification.

In the case of the third modification, since the operation of the normal web page disclosed by the information system 100 is used, the administrator of the information system 100 does not participate in the operation of setting the fictitious code.

A fictitious member information generation unit of the risk management support server 400 generates fictitious member information other than the fictitious code (S100). For example, in a case where a fictitious code is set as an address, an account name and a password, which are account information, an address, and other attributes are generated. The generation method is arbitrary. As in the case of generating a fictitious code, an existing sample code may be combined to generate fictitious information. However, it is not necessary to recognize the uniqueness as described above.

The fictitious code generation unit 462 of the risk management support server 400 generates a fictitious code according to the item type for which the fictitious code is set (S102). The uniqueness recognition unit 464 recognizes the uniqueness of the generated fictitious code (S104).

The fictitious member registration request unit of the risk management support server 400 requests the information system 100 to register a fictitious member (S106). Input to the web page for fictitious member registration may be performed automatically, or input to the web page may be performed by an operator. In a case where a web API for fictitious member registration is provided, the Web API may be used.

When receiving the fictitious member information, the information system 100 registers the fictitious member by a normal operation (S108), and notifies the risk management support server 400 of the completion of the registration (S110).

When the registration completion receiving unit of the risk management support server 400 receives the registration completion notification, the table update unit 466 updates the monitoring information table (S112).

Figure 11:
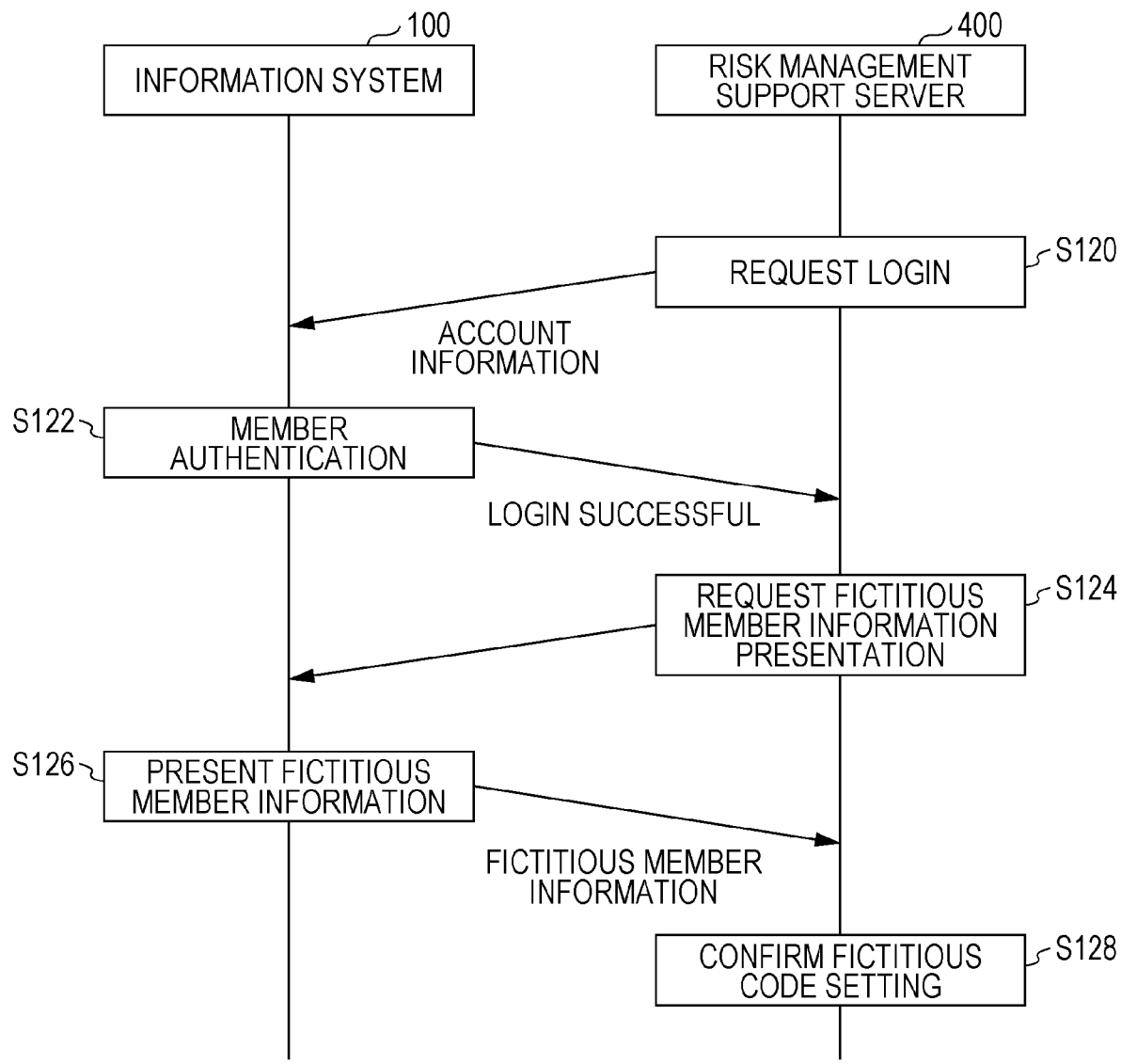
FIG. 11 is a sequence diagram of a fictitious code setting confirmation according to the third modification.

FIG. 11 is a sequence diagram of a fictitious code setting confirmation according to the third modification.

In a case where a fictitious code is set in the address, the address itself is not found even when an attempt is made to check the postal code of the address, and it is determined that the address is a false address. In this case, the account itself may be deleted, or the address may be rewritten to "unknown." Therefore, it is important to confirm that the fictitious code set as the address is being maintained.

In a membership site, a web page that presents member information for each registered member is prepared. This web page is hereinafter referred to as "My Page." By browsing My Page, a user can check the contents of the member information. According to the third modification, the setting status of the fictitious code is confirmed by periodically referring to My Page.

A login request unit of the risk management support server 400 requests the information system 100 to allow the login (S120). More specifically, the login request unit inputs account information (the account name and the password) to a login web page in the information system 100, and transmits the information to the information system 100.

When receiving the account information, the information system 100 performs member authentication based on the account name and the password (S122). When the account name and the password are valid, the login is successful, and the information system 100 notifies the risk management support server 400 of an authentication result indicating the successful login.

When the authentication result receiving unit of the risk management support server 400 receives the authentication result indicating the successful login, the fictitious member information presentation request unit requests the information system 100 to present the fictitious member information (S124). For example, a button operation for shifting to My Page is automatically executed. Alternatively, the operator may perform a button operation for shifting to My Page. By this operation, a fictitious member information request is transmitted to the information system 100. In other words, the HTTP request transmitted from the browser to the information system 100 by this button operation corresponds to a request for presentation of the fictitious member information.

When receiving the fictitious member information request, the information system 100 responds with the fictitious member information (S126). Specifically, the information system 100 transmits the web page data of My Page to the risk management support server 400. The fictitious member information including the fictitious code is set in the web page data.

When the fictitious member information receiving unit of the risk management support server 400 receives fictitious member information, the fictitious code setting confirmation unit 468 extracts the data of the item for which the fictitious code has been set in the fictitious member information and confirms whether the data matches the fictitious code (S128). The fictitious member information receiving unit is a part of the function of the browser. The data of the item for which the fictitious code has been set may be specified from the web page data, or the data of the item for which the fictitious code has been set may be read from an image of a screen displayed by the browser. For example, in a case where the fictitious code is set in the address, the address notation displayed in the address column is specified. In a case where the address notation displayed in the address column matches the fictitious code, the confirmation is successful. In a case where the address notation displayed in the address column does not match the fictitious code, the confirmation fails.

In a case where the confirmation fails, the fictitious code setting confirmation unit 468 warns the administrator of the information system 100 that the fictitious code has disappeared, as in the case of FIG. 7.

Not that, in a case where it is determined in S122 that the account name and the password are not valid, the login fails, and the information system 100 notifies the risk management support server 400 of an authentication result indicating the login failure. In a case where the risk management support server 400 receives the authentication result indicating the login failure, the fictitious code setting confirmation unit 468 also warns the administrator of the information system 100 that the fictitious code has disappeared. In this case, it is highly possible that the account itself has been deleted.

Fourth Modification

From the viewpoint of the operation of the information system 100, it is desirable to exclude a fictitious member from the business object. However, according to the third modification, since the risk management support server 400 registers a fictitious member, it is difficult for the information system 100 to determine the account of the fictitious member. According to the fourth modification, the information system 100 generates an account of a fictitious member, and the risk management support server 400 sets a fictitious code using the account. In other words, a fictitious code is included in the member information prepared by the information system 100. With such a configuration, the information system 100 can easily recognize the account of the fictitious member, and the smooth operation in the information system 100 can be facilitated.

In the case of the fourth modification, the receiving unit 440 of the risk management support server 400 further includes an account information receiving unit (not illustrated) and an update completion receiving unit (not illustrated).

Figure 12:
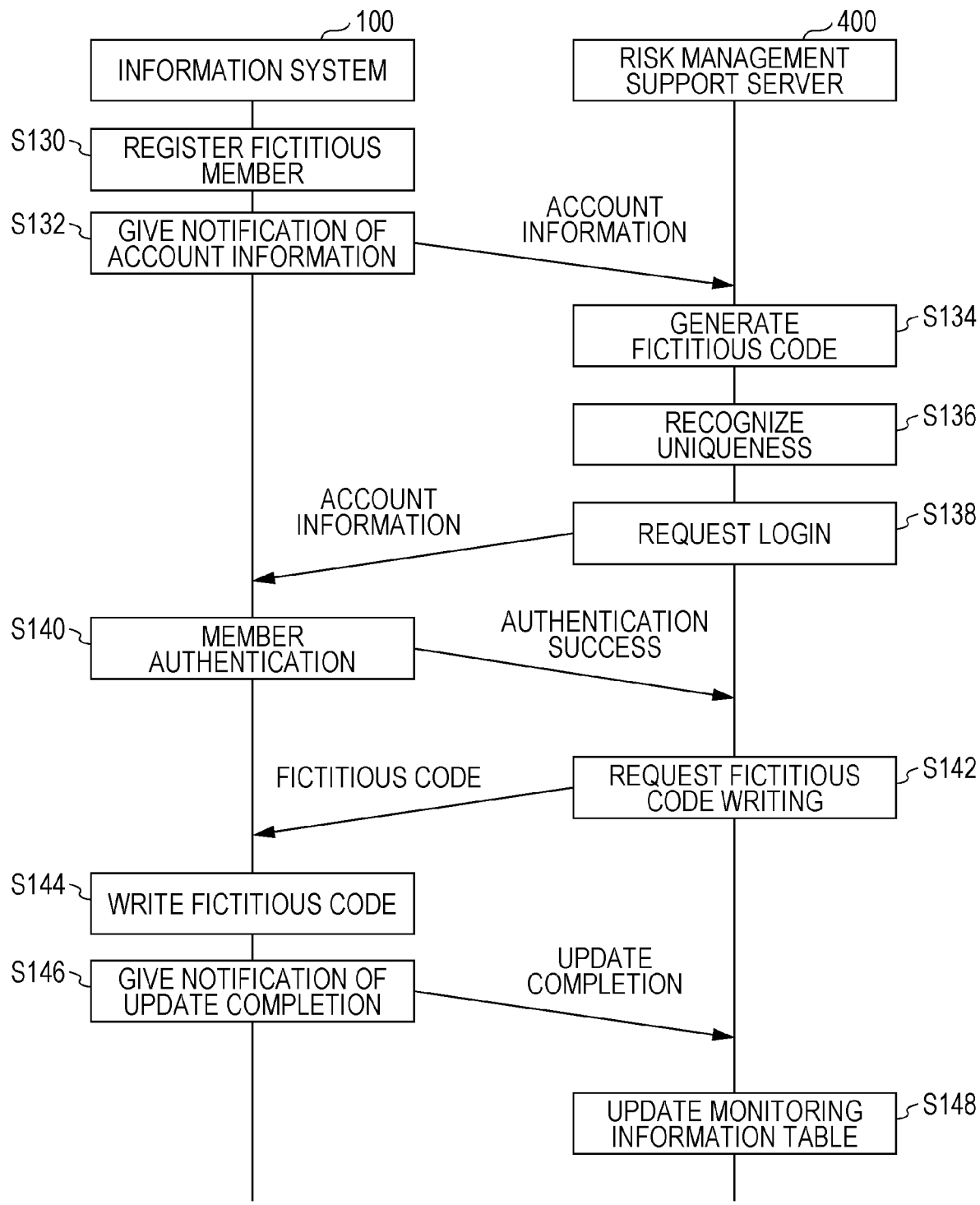
FIG. 12 is a diagram illustrating a sequence of a fictitious code setting phase (S10) according to a fourth modification.

FIG. 12 is a diagram illustrating a sequence of a fictitious code setting phase (S10) according to the fourth modification.

The administrator of the information system 100 generates account information (an account name and a password) and fictitious member information, and registers the fictitious member in the information system 100 (S130). The method of generating the fictitious member information and account information is arbitrary. At this stage, the fictitious member information is set, and a part thereof is later rewritten by the fictitious code. The administrator terminal of the information system 100 notifies the risk management support server 400 of the account information (S132). The account information may be notified by e-mail or sent by the browser after logging in to the website of the risk management support server 400 from the administrator terminal and inputting the account information (the account name and the password) on the account information notification web page.

When the account information receiving unit of the risk management support server 400 receives the account information, the fictitious code generation unit 462 generates a fictitious code according to the type of the item for which the fictitious code is set (S134). The item for setting the fictitious code may be determined in the risk management support server 400 or may be determined by an instruction by the administrator of the information system 100. Then, the uniqueness recognition unit 464 recognizes the uniqueness of the generated fictitious code (S136).

The login request unit of the risk management support server 400 requests the information system 100 using the notified account information to allow the login (S138). When the information system 100 performs the member authentication (S140) and the notification of the authentication result indicating the successful login is given to the risk management support server 400, the fictitious code providing unit 432 of the risk management support server 400 requests the fictitious code writing (S142). Specifically, an operation for shifting to My Page, an operation for inputting the fictitious code in an input field of an item for setting a fictitious code in a member information list displayed on My Page, and an operation for instructing of member information update are performed. These operations may be performed automatically or manually by an operator. The HTTP request sent from the browser to the information system 100 when the update of the member information is instructed in a state where the fictitious code is input corresponds to a fictitious code writing request.

When receiving the fictitious code write request, the information system 100 overwrites the confidential information with the member information including the fictitious code by a normal operation (S144). In other words, the member information is updated to the content including the fictitious code. The information system 100 notifies the risk management support server 400 of the completion of the update (S146). For example, a message of "The member information has been rewritten." displayed on My Page corresponds to the update completion notification.

When the update completion receiving unit of the risk management support server 400 receives the update completion notification, the table update unit 466 updates the monitoring information table (S148).

The confirmation of the fictitious code setting is the same as that of the third modification.

Other Modifications

The data size of the item may be added to the item type. Then, the size of the area where the fictitious code is set may be specified based on the data size.

As a method of generating the fictitious code, some characters of the sample code may be rewritten to characters selected at random. For example, when the first character of the sample code "acetylsalicylic acid" is replaced with a character "q" selected at random, a fictitious code "questyl salicylic acid" is generated.

As a method of generating the fictitious code, parts of the sample code may be exchanged. For example, when the name of the city and the name of the town in the sample code "o-x Nakai town, Matsudo city" are exchanged, and further the area number and house number are exchanged, a fictitious code "x-o Matsudo town Nakai city" is generated.

The leakage warning unit 436 of the risk management support server 400 may switch the warning mode depending on the type of the site where the fictitious code is found. For example, the color of the warning text and the background color may be made different between a case where the fictitious code is found on the dark web 300, a case where the fictitious code is found on the deep web 200 other than the dark web 300, and a case where the fictitious code is found on the surface web. Alternatively, a different alarm sound may be generated.

The table update unit 466 may record date and time when the fictitious code was set in the monitoring information table. Then, the leakage warning unit 436 may include the set date and time of the fictitious code in the leakage warning. With this configuration, it is useful to identify the timing at which the confidential information has leaked.

Further, the fictitious code may be updated periodically. In other words, another fictitious code is overwritten in the area where the fictitious code is set. In the case of updating the fictitious code, processing such as recognition of uniqueness is performed in a similar manner. Then, a search request is made to the monitoring site 500 using the new fictitious code as a search key. The table update unit 466 may record the date and time when the fictitious code was released in the monitoring information table. With this configuration, the period during which the fictitious code is used can be specified. The leakage warning unit 436 may include a period during which the fictitious code was used in the leakage warning. In a case where the interval at which the fictitious code is updated is shortened, it becomes easier to specify the timing at which the confidential information leaked. The fictitious code may be updated according to an instruction from the information system 100. For example, when a fictitious code limited to the period of affiliation with a certain company is used, it becomes easier to recognize the risk of data leakage in relation to that company.

Note that the present invention is not limited to the above embodiment and modifications, and can be embodied by modifying the components within the scope. Various inventions may be formed by appropriately combining a plurality of components disclosed in the above embodiment and modifications. In addition, some components may be deleted from all the components described in the above embodiment and modifications.

According to the present embodiment, since the fictitious code that is a part of the confidential information is provided to the information system 100, the burden of generating the fictitious code on the information system 100 side is reduced.

In addition, since a fictitious code corresponding to a setting item is provided, it is possible to set a fictitious code for various items.

Further, since a fictitious code expected to be at least unique is used, confusion with a code included in data other than the confidential information can be avoided. In other words, the function as a mark of the fictitious code can be enhanced.

In addition, since the uniqueness of the fictitious code is recognized as compared with a plurality of sample codes, the certainty of the uniqueness can be increased.

Further, for example, by accessing a user interface for newly registering a member and including the fictitious code in the item contents of the registered member, the setting of the fictitious code in the membership site can be performed without increasing the load on the information system 100.

Also, since the setting status of the fictitious code is confirmed based on the member information presented by the information system 100, it is easy to find the disappearance of the fictitious code.

Further, in a case where the fictitious code is lost, a warning is given to the administrator of the information system, so that it is easy to take measures such as restoring a fictitious code. Therefore, the period during which no fictitious code is set can be shortened.

In addition, the search system for monitoring the website is made to search for the fictitious code, and a warning is issued when the fictitious code is found, so that leakage of the confidential information from the information system 100 can be easily detected.

REFERENCE SIGNS LIST

100 Information system
200 Deep web
300 Dark web
400 Risk management support server
500 Monitoring site
404 Communication unit
406 Data processing unit
408 Data storage unit
430 Transmitting unit
440 Receiving unit
432 Fictitious code providing unit
434 Reference requesting unit 436 Leakage warning unit
442 Fictitious code request receiving unit
444 Setting completion receiving unit
446 Fictitious code response receiving unit
448 Alert notification receiving unit
462 Fictitious code generation unit
464 Uniqueness recognition unit
466 Table update unit
468 Fictitious code setting confirmation unit
470 Information system specifying unit
472 Search requesting unit
482 Monitoring information table storage unit
484 Information system management table storage unit
488 Address database
490 Name database
492 Medicine database

The invention claimed is:

1. A risk management support device connected, via a communication network, to an information system that manages confidential information, the risk management support device comprising:
an arithmetic unit; and
a storage device storing instructions that, when executed by the arithmetic unit, cause the risk management support device to:
receive, from the information system, a request to acquire a fictitious code to be set in a part of items in the confidential information as well as a type of the item;
generate the fictitious code corresponding to a data format of the received type of the item; and
transmit the generated fictitious code to the information system only when uniqueness of the generated fictitious code is recognized,
wherein the risk management support device is further connected, via the communication network, to an external search system that monitors a web and finds out data that satisfies a search condition among data distributed on the web, and
the instructions, when executed by the arithmetic unit, further cause the risk management support device to:
request the external search system to search for data among the data distributed on the web by designating the fictitious code as the search condition, the fictitious code being set as a mark for detecting leakage of the confidential information by the external search system;
receive, from the external search system, a notification indicating that the fictitious code has been found in the data distributed on the web; and
warn the information system corresponding to the fictitious code that the confidential information has leaked in a case where the notification indicating that the fictitious code has been found is received.

2. The risk management support device according to claim 1, wherein
the information system includes a user interface for accepting an item content to be registered in the confidential information, and
the instructions, when executed by the arithmetic unit, further cause the risk management support device to access the user interface of the information system and registers the fictitious code in the confidential information as including the fictitious code in a part of the item content.

3. The risk management support device according to claim 2, wherein the instructions, when executed by the arithmetic unit, further cause the risk management support device to:
request the information system to present the registered item content, and
confirm that the fictitious code is set in a part of the item content presented by the information system.

4. The risk management support device according to claim 1, wherein the web monitored by the external search system is a deep web.

5. The risk management support device according to claim 1, wherein the web monitored by the external search system is a dark web.

6. The risk management support device according to claim 1, wherein the instructions, when executed by the arithmetic unit, further cause the risk management support device to designate the fictitious code set in the part of the items in the confidential information and the type of the item as the search condition, the fictitious code and the type of the item being set as marks for detecting leakage of the confidential information by the external search system.

* * * * *